(12) United States Patent
Hsieh et al.

(10) Patent No.: US 11,042,295 B2
(45) Date of Patent: Jun. 22, 2021

(54) CONTROL METHOD, ELECTRONIC DEVICE AND NON-TRANSITORY COMPUTER READABLE STORAGE MEDIUM

(71) Applicant: ASUSTEK COMPUTER INC., Taipei (TW)

(72) Inventors: Chih-Wen Hsieh, Taipei (TW); Hung-Yi Lin, Taipei (TW); Chin-Wen Lin, Taipei (TW); Hao-Ping Lin, Taipei (TW); Meng-Ju Lu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 103 days.

(21) Appl. No.: 15/940,276

(22) Filed: Mar. 29, 2018

(65) Prior Publication Data
US 2018/0284968 A1 Oct. 4, 2018

(30) Foreign Application Priority Data

Mar. 31, 2017 (CN) .......................... 201710208496.5

(51) Int. Cl.
*G06F 3/0489* (2013.01)
*G06F 3/0488* (2013.01)
*G06F 1/16* (2006.01)

(52) U.S. Cl.
CPC ............ *G06F 3/0489* (2013.01); *G06F 1/165* (2013.01); *G06F 1/169* (2013.01); *G06F 3/0488* (2013.01)

(58) Field of Classification Search
CPC ...... G06F 3/0489; G06F 3/0488; G06F 1/165; G06F 1/169; G06F 1/1692
See application file for complete search history.

(56) References Cited

U.S. PATENT DOCUMENTS

| 2004/0239645 | A1* | 12/2004 | Numano | ............. | G06F 3/04883 345/173 |
| 2006/0034042 | A1* | 2/2006 | Hisano | .................. | G06F 1/1656 361/679.04 |
| 2007/0143518 | A1* | 6/2007 | Kim | ...................... | G06F 1/1616 710/303 |
| 2008/0270899 | A1* | 10/2008 | Duncan | ................ | G06F 1/1692 715/700 |

(Continued)

FOREIGN PATENT DOCUMENTS

| CN | 102197358 A | 9/2011 |
| CN | 102197358 A | 9/2011 |
| TW | 201109884 A1 | 3/2011 |

*Primary Examiner* — Shen Shiau
(74) *Attorney, Agent, or Firm* — Muncy, Geissler, Olds & Lowe, P.C.

(57) ABSTRACT

The disclosure discloses a control method. The control method comprises: determining that a practical operation event is triggered; determining that whether the practical operation event conforms to one of predetermined operation events to generate a determining result; defining predetermined operation event corresponding to the practical operation event as an instant operation interface, and defining an operation interface corresponding to the predetermined operation event as an instant operation interface when the determining result is yes; and displaying the instant operation interface on a touch operation display.

6 Claims, 9 Drawing Sheets

(56) References Cited

U.S. PATENT DOCUMENTS

| | | | |
|---|---|---|---|
| 2009/0235281 A1* | 9/2009 | Lu | G06F 3/04886 719/318 |
| 2009/0289917 A1* | 11/2009 | Saunders | G06F 3/05 345/174 |
| 2009/0315867 A1* | 12/2009 | Sakamoto | G06F 3/03547 345/184 |
| 2009/0320070 A1* | 12/2009 | Inoguchi | H04N 21/4126 725/40 |
| 2010/0217657 A1* | 8/2010 | Gazdzinski | G01C 21/00 705/14.5 |
| 2010/0255862 A1* | 10/2010 | Mitsunaga | G06F 3/0362 455/466 |
| 2010/0267423 A1* | 10/2010 | Yamakita | G06F 3/0238 455/566 |
| 2011/0047459 A1* | 2/2011 | Van Der Westhuizen | G06F 1/1692 715/702 |
| 2011/0098019 A1* | 4/2011 | Fujii | G06F 3/041 455/411 |
| 2011/0173080 A1* | 7/2011 | Kutsumi | G06Q 30/0241 705/14.73 |
| 2011/0199361 A1* | 8/2011 | Shin | G06F 1/1616 345/211 |
| 2011/0202875 A1* | 8/2011 | Kimura | G06F 3/0412 715/810 |
| 2011/0205178 A1* | 8/2011 | Yoshida | G06F 1/1692 345/173 |
| 2011/0242026 A1* | 10/2011 | Ishigaki | G06F 16/9038 345/173 |
| 2012/0013562 A1* | 1/2012 | Jyonoshita | G06F 3/0488 345/173 |
| 2012/0306773 A1* | 12/2012 | Yeung | G06F 3/04886 345/173 |
| 2013/0321340 A1* | 12/2013 | Seo | G06F 1/1641 345/174 |
| 2014/0173502 A1* | 6/2014 | Lu | G06F 3/0481 715/781 |
| 2015/0062038 A1* | 3/2015 | Taniuchi | G06F 1/1692 345/173 |
| 2017/0010771 A1* | 1/2017 | Bernstein | G06F 3/0482 |
| 2019/0129473 A1* | 5/2019 | Hu | G06F 3/04886 |
| 2020/0133475 A1* | 4/2020 | Yeh | G06F 3/04886 |

* cited by examiner

CONTROL METHOD, ELECTRONIC DEVICE AND NON-TRANSITORY COMPUTER READABLE STORAGE MEDIUM

CROSS-REFERENCE TO RELATED APPLICATION

This application claims the priority benefit of CN application serial No. 201710208496.5, filed on Mar. 31, 2017. The entirety of the above-mentioned patent application is hereby incorporated by references herein and made a part of specification.

BACKGROUND OF THE INVENTION

Field of the Invention

The disclosure relates to a control method, and more specifically, to a control method applied to an electronic device with a touch display.

Description of the Related Art

In recent years, due to the popularity of smart phones, users get used to intuitive touch operations via a touch screen. As a result, an electronic device, such as a notebook computer, is usually equipped with a touch screen. Then, different operation modes are provided.

BRIEF SUMMARY OF THE INVENTION

According to a first aspect, a control method is provided. The control method is applied to an electronic device with a main display and a touch operation display. The control method comprises: determining that a practical operation event is triggered; determining whether the practical operation event conforms to one of predetermined operation events preset in the electronic device, and each of the predetermined operation events is corresponded to an operation interface; defining the predetermined operation event corresponding to the practical operation event as an instant operation event, and defining the operation interface corresponding to the predetermined operation event as an instant operation interface when the practical operation event conforms to one of the predetermined operation events; and displaying the instant operation interface on the touch operation display.

According to a second aspect, a non-transitory computer readable storage medium is provided. At least one program command is recorded in the non-transitory computer readable storage medium, the program command is applied to an electronic device with a main display and a touch operation display, and after the program command is loaded to the electronic device, following steps are executed. The steps comprise: determining that an practical operation event is triggered; determining whether the practical operation event conforms to one of predetermined operation events preset in the electronic device, and each of the predetermined operation events is corresponded to an operation interface; defining the predetermined operation event corresponding to the practical operation event as an instant operation event, and defining the operation interface corresponding to the predetermined operation event as an instant operation interface when the practical operation event conforms to one of the predetermined operation events; and displaying the instant operation interface on the touch operation display.

According to a third aspect, an electronic device is provided. A plurality of predetermined operation events are preset in the electronic device, and each of the predetermined operation event corresponds to an operation interface. The electronic device comprises a host and a main display. The host includes a host body, a system module, and a touch operation display. The system module is built in the host body and is configured to determine that a practical operation event is triggered, define the predetermined operation event as an instant operation event and define the operation interface corresponding to the predetermined operation event as an instant operation interface when the practical operation event conforms to the predetermined operation event. The touch operation display is disposed in the host body, electrically connected to the system module, and is configured to display the instant operation interface. The main display is electrically connected to the host body.

In sum, according to a control method in embodiments, the practical operation event generated during an operation of the operating system is compared with the predetermined operation event. When the practical operation event conforms to the predetermined operation event, a corresponding operating interface is displayed on the touch operation display. Then, the user can operate via the touch operation display such that the operational convenience of the operating system is improved.

These and other features, aspects and advantages of the present invention will become better understood with regard to the following description, appended claims, and accompanying drawings.

DETAILED DESCRIPTION OF THE EMBODIMENTS

Figure 1A:
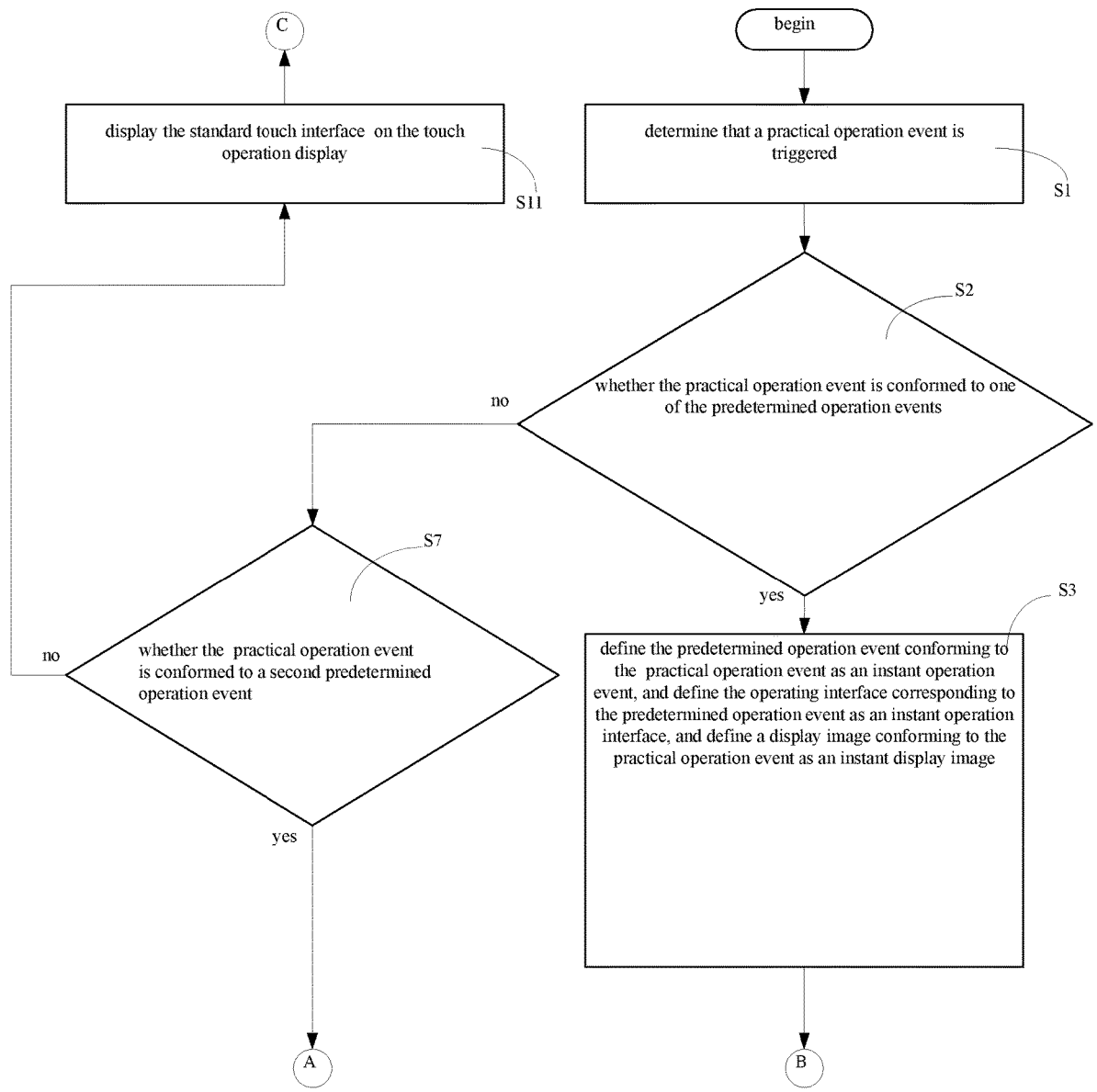
FIG. 1A and FIG. 1B are flow charts showing a system control method in an embodiment.
Figure 1B:
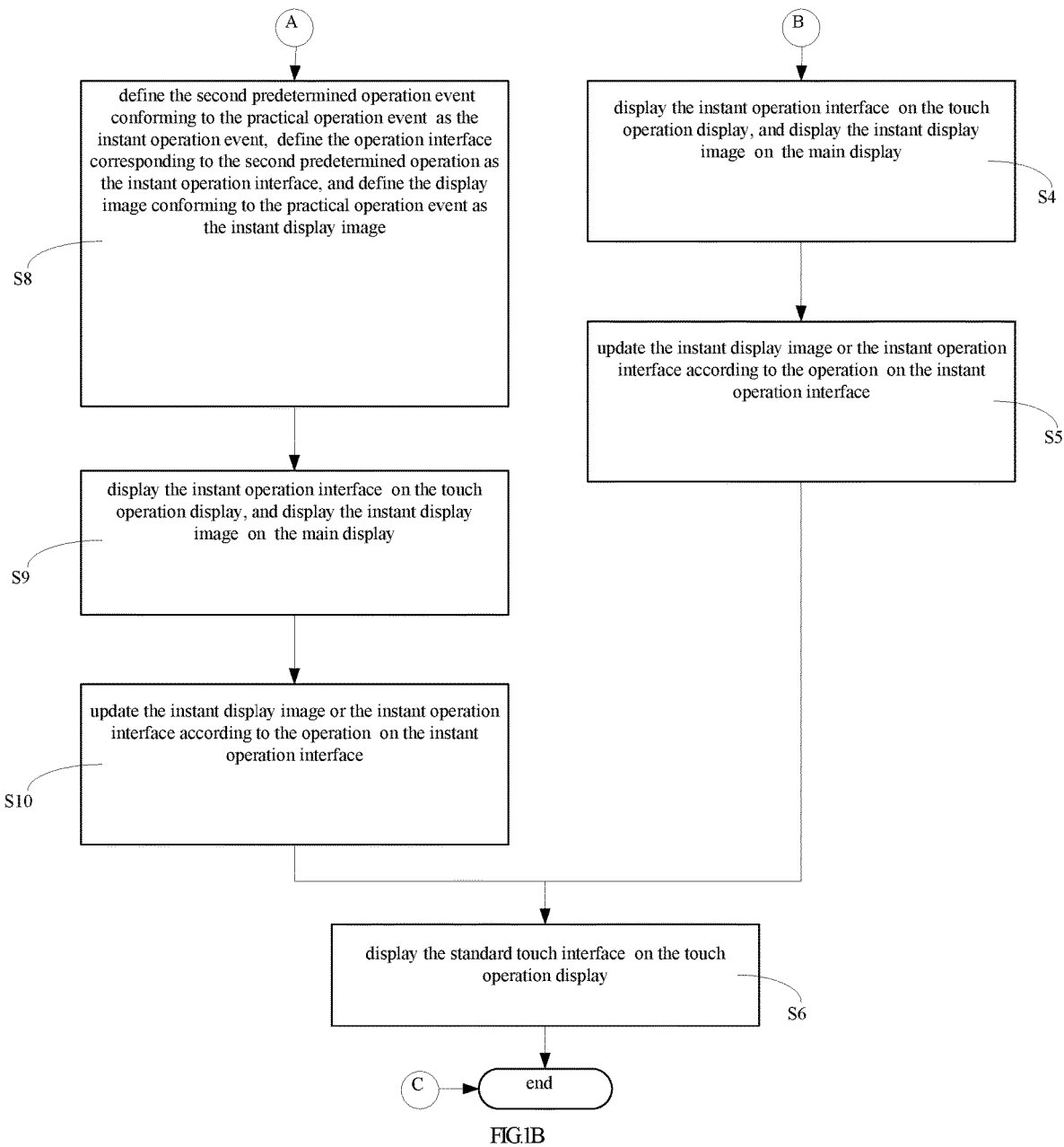

These and other features, aspects, and advantages of the disclosure will become better understood with regard to the following description, appended claims, and accompanying drawings. The components are not used to limit the size or the proportion shown in figures.

Please refer to FIG. 1A to FIG. 3. In an embodiment, an electronic device 100 includes a host 1 and a main display 2. The main display 2 is electrically connected with the host 1. The host 1 includes a host body 11, a system module 12, a touch operation display 13, a keyboard 14 and a connecting port 15. The system module 12 is built in the host body 11. In an embodiment, the system module 12 includes a storage device 121 and a processing unit 122. The storage device 121 is configured to store computer program data and a plurality of predetermined operation events. The control method in FIG. 1A to FIG. 3 includes the following steps.

In step S1, it is determined that a practical operation event is triggered. In an embodiment, when a triggering notification of the practical operation event is received by the system module 12 or the practical operation event is detected when the operating system is executed by the system module 12, it is determined that the practical operation event is triggered, which is not limited herein.

In an embodiment, the practical operation event at least includes a key operation event and an application program operation event. The key operation event indicates that at least one key of the keyboard 14, or a function key or a shortcut key of the electronic device 100 is pressed. The application program operation event includes that an application program is initiated or an object of an application program is operated during the execution of the application program. In an embodiment, the application program is triggered or the object is operated via a cursor (by using a mouse or a touch operation display 13) or the keyboard 14, which is not limited herein. The operation of an application program by using the other way can be regarded as the application program operation event.

In an embodiment, a predetermined operation event is a key operation event or an application program operation event. The key operation event is that at least one key of the keyboard, or a function key or a shortcut key of the electronic device is pressed. The application program operation event includes that an application program is initiated or an object of an application program is operated during the execution of the application program, which is not limited herein.

In an embodiment, the practical operation event is the key operation event, and the system module 12 actively detects whether the key operation event is triggered when the operating system is executed by the system module 12, which is not limited herein.

In an embodiment, the practical operation event is the application program operation event. When a triggering notification of the application program operation event from the application program is received by the system module 12, it is determined that the application program operation event is triggered, which is not limited herein.

In step S2, the system module 12 determines whether the practical operation event conforms to one of the predetermined operation events (such as a first predetermined operation event of the predetermined operation events) to generate a determining result (such as a first determining result). The processing unit 122 of the system module 12 is electrically connected to the storage device 121. The processing unit 122 detects the practical operation event and determines whether the practical operation event conforms to one of the predetermined operation events according to the computer program data.

In an embodiment, the storage device 121 is a memory, a hard disk, or a flash drive memory card. The processing unit 122 is implemented by a microcontroller, a microprocessor, a digital signal processor, an application specific integrated circuit (ASIC) or a logic circuit.

The touch operation display 13 is disposed on the host body 11 and is electrically connected with the processing unit 122 of the system module 12 to display the instant operation interface. The keyboard 14 and the connecting port 15 are electrically connected with the processing unit 122, respectively. The connecting port 15 is configured to connect with a mouse MS. In an embodiment, the electronic device 100 is a notebook computer. Computer program data is installed in the operating system of the notebook computer. The practical operation event generated by executing the operating system is detected via the computer program data.

When it is determined that the practical operation event conforms to one of the predetermined operation events (that is, the first predetermined operation event), the step S3 is executed. In an embodiment, the first predetermined operation event is an application program operation event that the application program is initiated. As a result, the first determining result is generated by determining whether the practical operation event is the application program operation event that the application program is initiated.

In the step S3, the system module 12 defines the predetermined operation event (that is, the first predetermined operation event) conforming to the practical operation event as an instant operation event, defines the operating interface corresponding to the predetermined operation event as an instant operation interface, and defines a display image corresponding to the predetermined operation event as an instant display image. In an embodiment, when plural predetermined operation events are predetermined, a plurality of operation interfaces and display images corresponding to the predetermined operation events are also predetermined. As a result, when the first predetermined operation event conforming to the practical operation event is defined as an instant operation event, the operation interface corresponding to the first predetermined operation event is defined as an instant operation interface, and the display image corresponding to the first predetermined operation event is defined as an instant display image. In an embodiment, when the first predetermined operation event is the application program operation event that the application program is initiated, the operation interface and the display image corresponding to that the application program is initiated are defined as the instant operation interface and the instant display image, respectively, which is not limited herein. In an embodiment, the operation interface is predetermined to correspond to the predetermined operation event, but no display image is predetermined to correspond to the predetermined operation event.

In step S4, the instant operation interface is displayed on the touch operation display 13. The instant display image is displayed on the display screen 21 of the main display 2.

Figure 2:
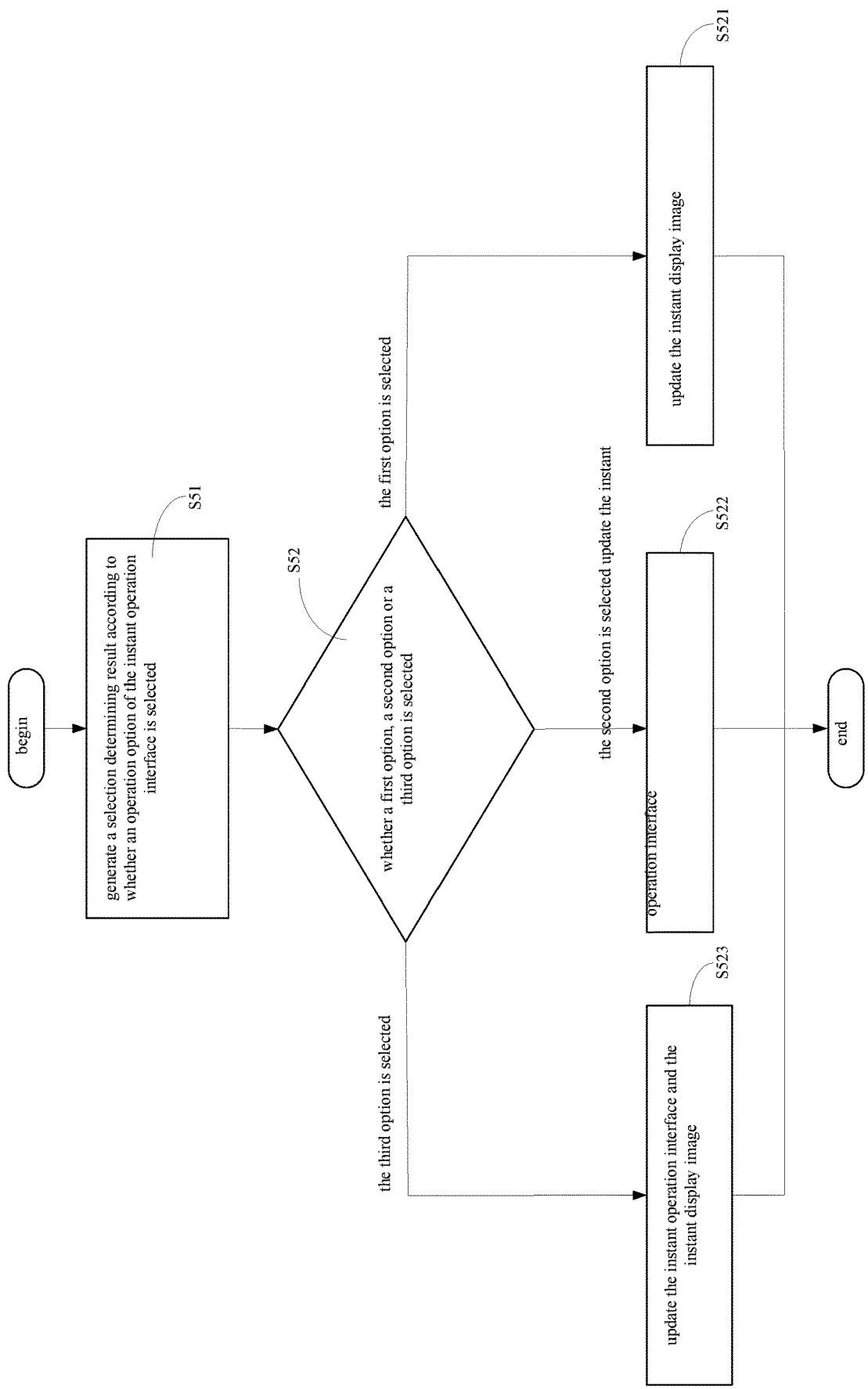
FIG. 2 is a flow chart showing that an instant operation interface is selected in a control method in an embodiment.
Figure 3:
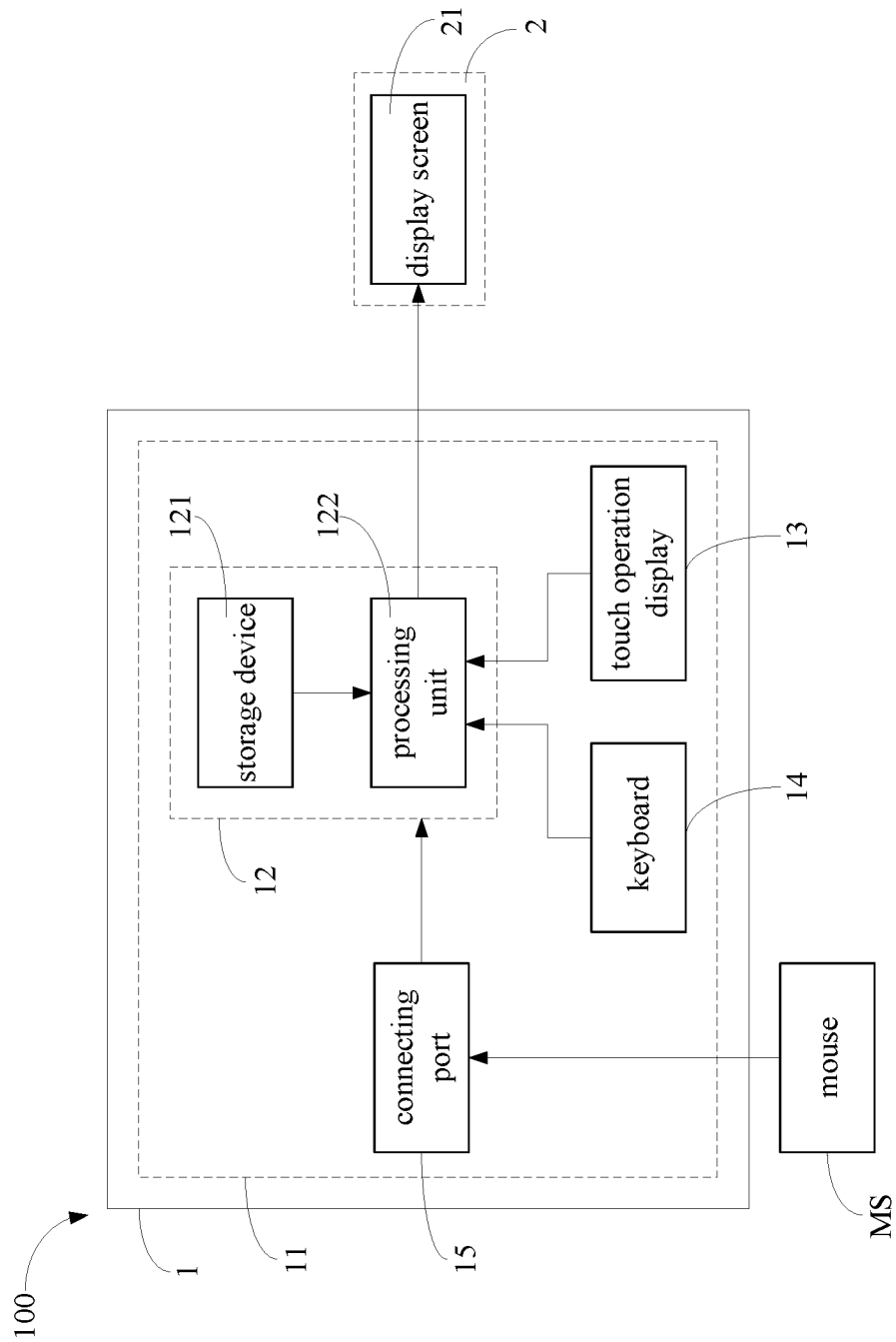
FIG. 3 is a schematic diagram showing an electronic device adapted for a control method in an embodiment.

In step S5, the instant display image or the instant operation interface is updated according to an operation on the instant operation interface. As shown in FIG. 2, the step S5 includes the following steps.

In step S51, a selection determining result is generated according to whether an operation option of the instant operation interface is selected.

In step S52, when the selection determining result is that the first option is selected, step S521 is executed. When the selection determining result is that the second option is selected, step S522 is executed. When the selection determining result is that the third option is selected, step S523 is executed.

In an embodiment, the first option is a program operation option. Then, in step S521, when the first option is selected, the instant display image is updated according to the operation of the selection. The second option is an interface operation option. Then, in step S522, when the second option is selected, the instant operation interface is updated according to the operation of the selection. The third option is a synchronous operation option. Then, in step S523, when the third option is selected, the operation interface and the instant display image are updated according to the operation of the selection.

In an embodiment, when the application program is Microsoft Word, the first option is a common option of the fonts. Then, when the first option is selected, the object of the instant display image, such as the font, is changed accordingly. The second option is an advanced option of the fonts, a detailed option of the advanced option is displayed on the instant operation interface after the second option is selected. The third option is an option for opening another file. Then, when another file is opened, a content of the other file is displayed on the instant display image, and the instant operation interface is changed to the operation interface corresponding to the application program being initiated.

After the step S5, in step S6, an image of the touch operation display 13 is switched to a standard touch interface (such as a touch pad mode).

When the determining result of the step S2 is no, the step S7 is executed. In step S7, a second determining result is generated according to whether the practical operation event conforms to a second predetermined operation event.

In the step S7, when it is determined that the practical operation event dose not conformed to the second predetermined operation event, the process continues to determine that whether the practical operation event conforms to the other predetermined event. When no predetermined operation event conforms to the practical operation event, the step S7 ends and the image of the touch operation display 13 is switched to the standard touch interface.

In step S7, when it is determined that the practical operation event conforms to the second predetermined operation event, step S8 is executed. In step S8, the second predetermined operation event conforming to the practical operation event is defined as the instant operation event. The operation interface corresponding to the second predetermined operation event is defined as the instant operation interface. The display image conforming to the practical operation event is defined as the instant display image. In an embodiment, the second predetermined operation event is a key operation event. The step S8 is similar to the step S3, which is not repeated herein.

Please refer to FIG. 1A. In an embodiment, the predetermined operation events comprise the first predetermined operation event and the second predetermined operation event. As a result, in step S7, when it determined that the practical operation event does not conform to the second predetermined operation event, the step S11 is executed and the standard touch interface is displayed on the touch operation display 13. When the number of the predetermined operation events is more, and it is determined that no predetermined operation events conform to the practical operation event, the image of the touch operation display 13 is switched to the standard touch interface.

In step S9, the instant operation interface is displayed on the touch operation display 13. The instant display image is displayed on the main display 2. The step S9 is similar to the step S4, which is not repeated herein.

In step S10, the instant display image or the instant operation interface is updated according to the operation on the instant operation interface. In step S9, the instant operation interface is displayed on the touch operation display 13. The instant display image is displayed on the display screen 21 of the main display 2. The step S9 is similar to the step S4, which is not repeated herein.

Moreover, after the step S10, the step S6 is continued to be executed. The standard touch interface is displayed on the touch operation display 13.

In an embodiment, the control method is executed via a non-transitory computer readable storage medium. At least one program command is recorded in the non-transitory computer readable storage medium. After the program command is loaded into the electronic device, the following steps are executed: determining that a practical operation event is triggered; determining whether the practical operation event conforms to one of the predetermined operation events predetermined in the electronic device. In an embodiment, each predetermined operation event corresponds to an operation interface. When a determining result is yes, the predetermined operation event conforming to the practical operation event is defined as an instant operation event. The operation interface corresponding to the predetermined operation event is defined as an instant operation interface, and the instant operation interface is displayed on the touch operation display.

In an embodiment, an expanding platform of a system development end is provided for registering predetermined operation events (that is, logging in a related software package for the predetermined operation event) via a software development end to expand the predetermined operation events, which is not limited herein.

As mentioned above, in practical usage, multiple predetermined operation events are continuously and repeatedly determined according to the control method. The predetermined operation events are not limited to the first predetermined operation event and the second operation event in the above embodiments.

Figure 4:
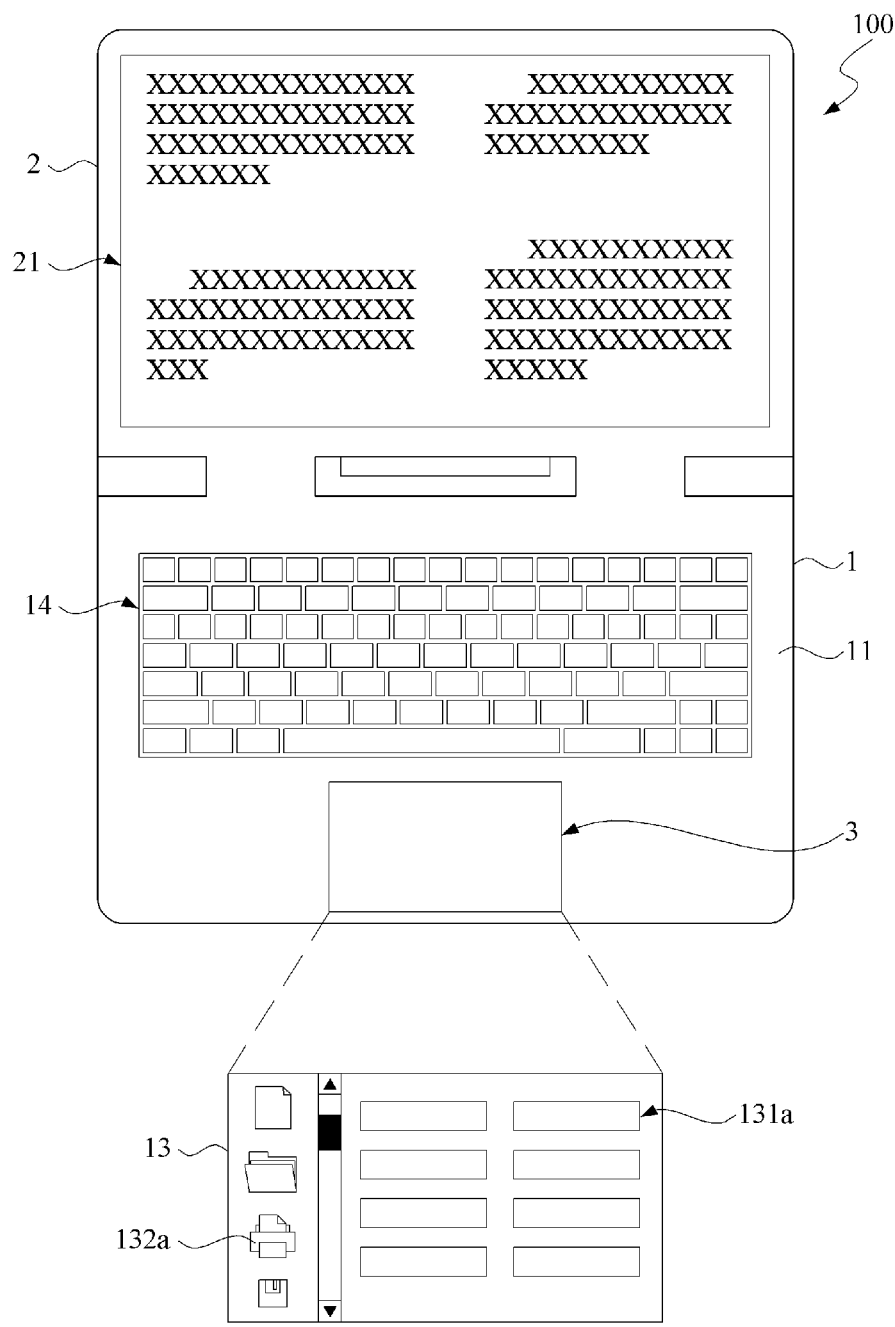
FIG. 4 is a schematic diagram showing that an instant display image is displayed on a main display and an operation interface is displayed on a touch operation display via a system control method in an embodiment.

Please refer to FIG. 4. FIG. 4 is a schematic diagram showing that an instant display image is displayed on a main display and an operation interface is displayed on a touch operation display via a system control method in an embodiment.

As shown in FIG. 4, initiating the application program is defined as the application program operation event, and the application program operation event is regarded as the predetermined operation event built into the system module 12. After the application program is initiated by moving the cursor or operating the keyboard 14, the system module 12 is executed via the control method. In step S4, the instant operation interface is displayed on the touch operation display 13. The instant display image is displayed on the display screen 21 of the main display 2. In the embodiment, according to the control method, the content image of the application program is displayed on the display screen 21, and a control option of the application program is displayed on the touch operation display 13 via a predetermined operation interface when the user starts the application program. Then, the user can control the content image of the application program via an operation on the instant operation interface.

In an embodiment, eight options 131a (only one is numbered in figure) and four options 132a (only one is numbered in figure) are displayed on the instant operation interface.

The option 131a belongs to the first option in the step S5. The option 132a belongs to the second option in the step S5. That is, when the option 131a is selected, the instant display image is updated. When the option 132a is selected, the instant operation interface is updated.

Figure 5:
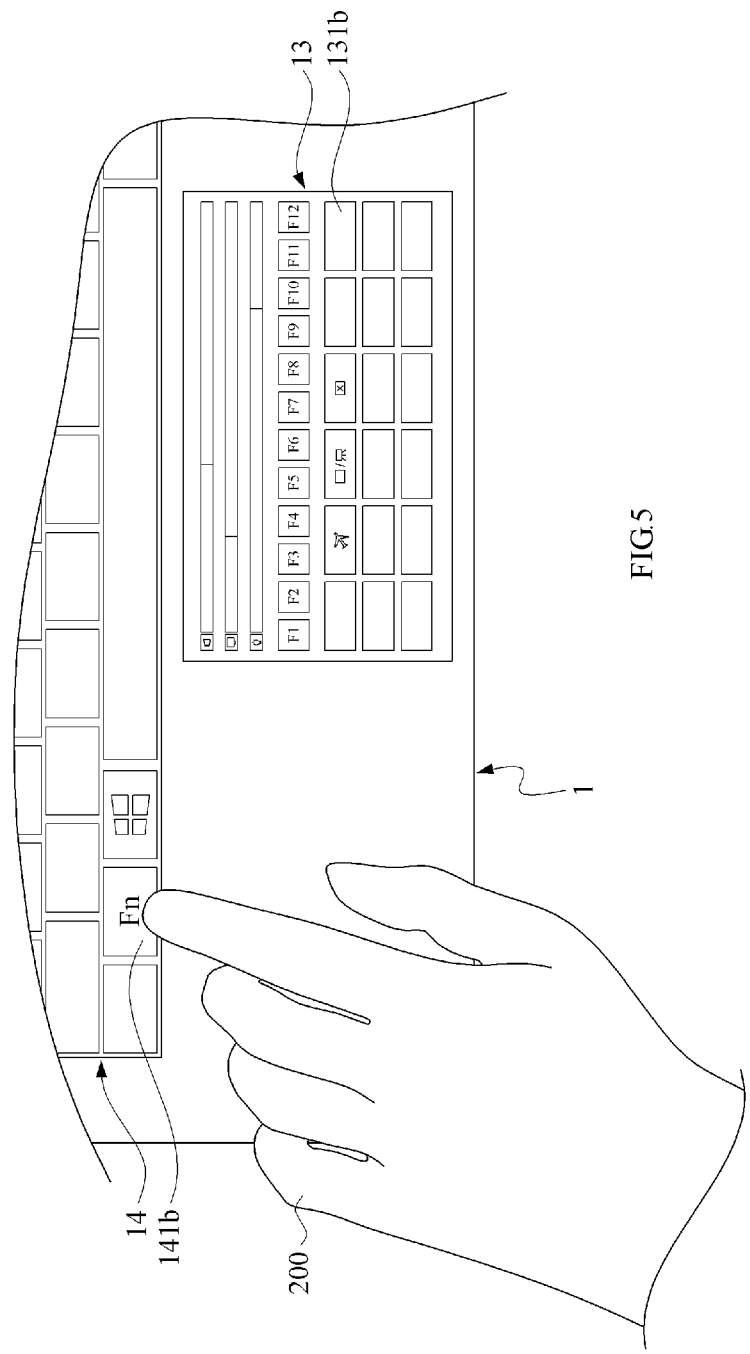
FIG. 5 is a schematic diagram showing an instant operation interface displayed on a touch operation display when the practical operation event is a key operation event according to a control method in an embodiment.

Please continue to refer to FIG. 5. FIG. 5 is a schematic diagram showing a corresponding instant operation interface is displayed on a touch operation display when a practical operation event is a key operation event according to a control method in an embodiment. As shown in FIG. 5, when a function key 141b of the keyboard 14 is pressed by a user. The key operation event that the function key 141b is pressed is defined as a practical operation event in step S1. Furthermore, in the step S4, the instant operation interface corresponding to the practical operation event is displayed on the touch operation display 13. Then, a plurality of touch options 131b (only one is numbered in figure) are displayed on the touch operation display 13.

The notebook computer includes an Fn key (that is, the function key 141b). Various functions are triggered by combinations of the function key 141b and other keys. When the Fn key is pressed, options representing various functions are displayed on the touch operation display 13 to facilitate the operation.

Figure 6:
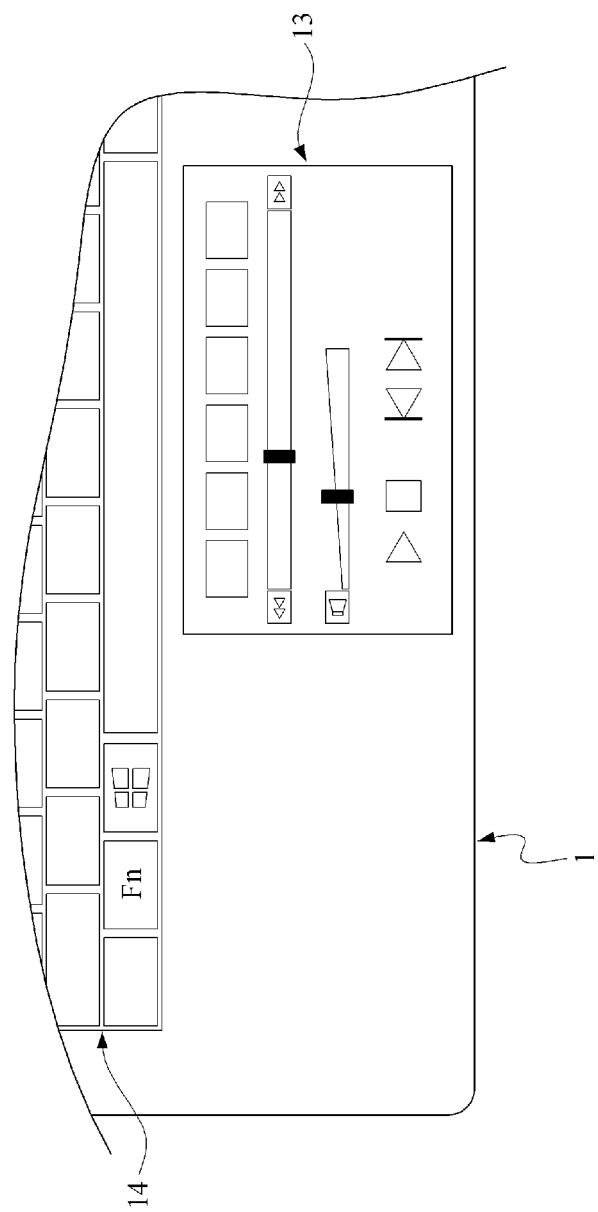
FIG. 6 is a schematic diagram showing an instant operation interface displayed on a touch operation display when the practical operation event is an application program operation event according to a control method in an embodiment.

Please continue to refer to FIG. 6. FIG. 6 is a schematic diagram showing a corresponding instant operation interface is displayed on a touch operation display when a practical operation event is an application program operation event according to a control method in an embodiment. As shown in FIG. 6, when the application program of the operating system is initiated, according to the step S1 of the control method, the application program operation event is defined as a practical operation event. The instant operation interface corresponding to the practical operation event is displayed on the touch operation display 13 according to the step S4 of the control method. Then, a plurality of touch options 131c (only one is numbered in figure) are displayed on the touch operation display 13.

In an embodiment, the application program is a video playing program. As a result, when a full screen function of the video playing program is triggered, the control options of the video are displayed via the touch operation display 13. Then, the whole display screen 21 is configured to display the video, and control options would not cover the display screen 21 such that the operational convenience is improved.

Figure 7:
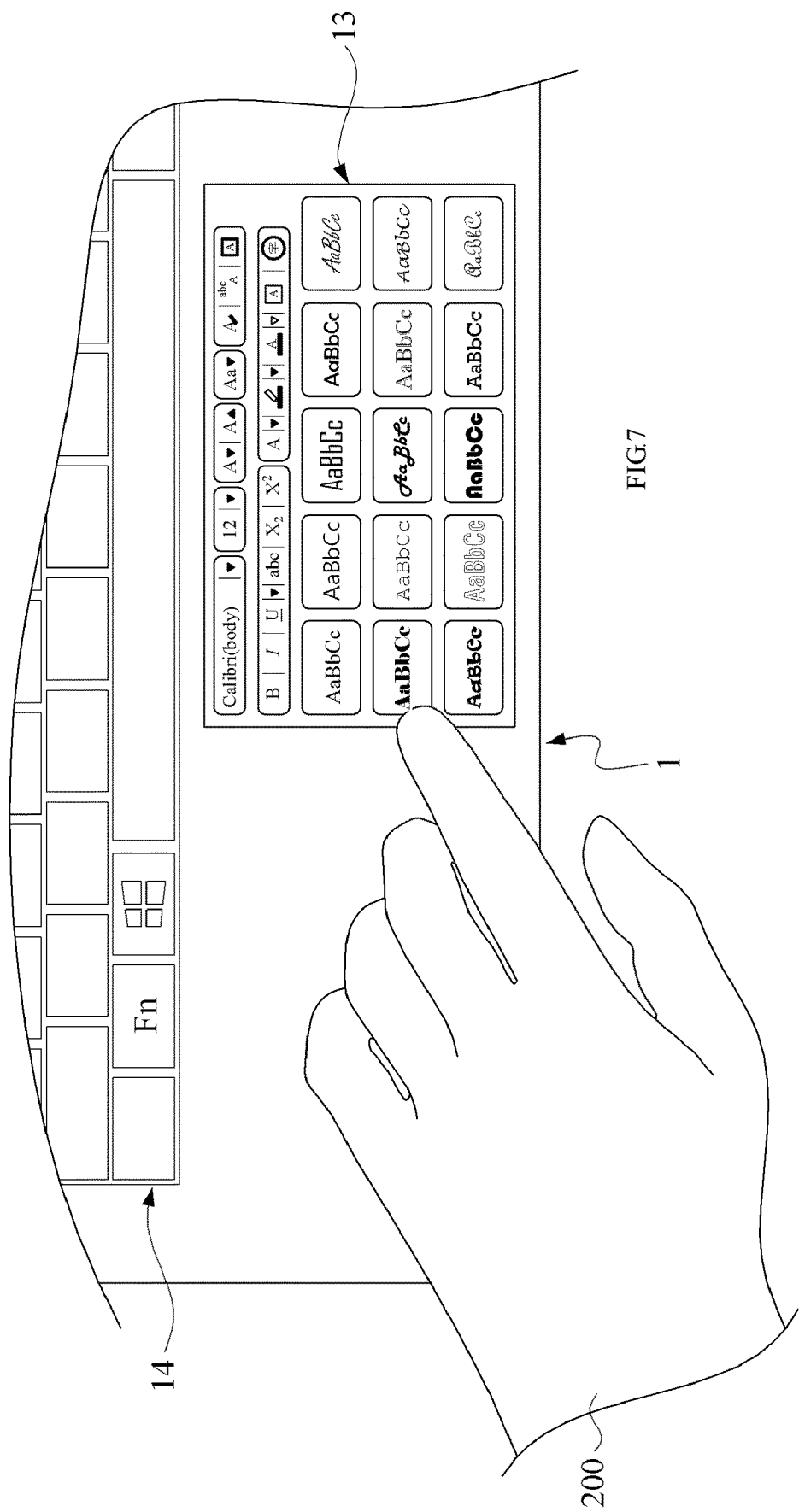
FIG. 7 is a schematic diagram showing an instant operation interface displayed on a touch operation display when the practical operation event is a application program operation event according to a control method in an embodiment.

Please continue to refer to FIG. 7. FIG. 7 is a schematic diagram showing an instant operation interface corresponding to an application program operation event is displayed on a touch operation display when a practical operation event is the application program operation event in an embodiment. As shown in FIG. 7, according to the step S1 in the control method, when the application program of the operating system is initiated, the application program operation event is defined as a practical operation event. The instant operation interface corresponding to the practical operation event is displayed on the touch operation display 13 according to the step S4 in the control method.

In an embodiment, the application program is a word processing program. When a text or a symbol in the word processing program is selected, tool options related to the adjustment of a font size or a font format are displayed via the touch operation display 13. Then, the user does not need to find the corresponding tool option among a toolbar of the application program in the display screen 21. As a result, the operational convenience is improved.

Figure 8:
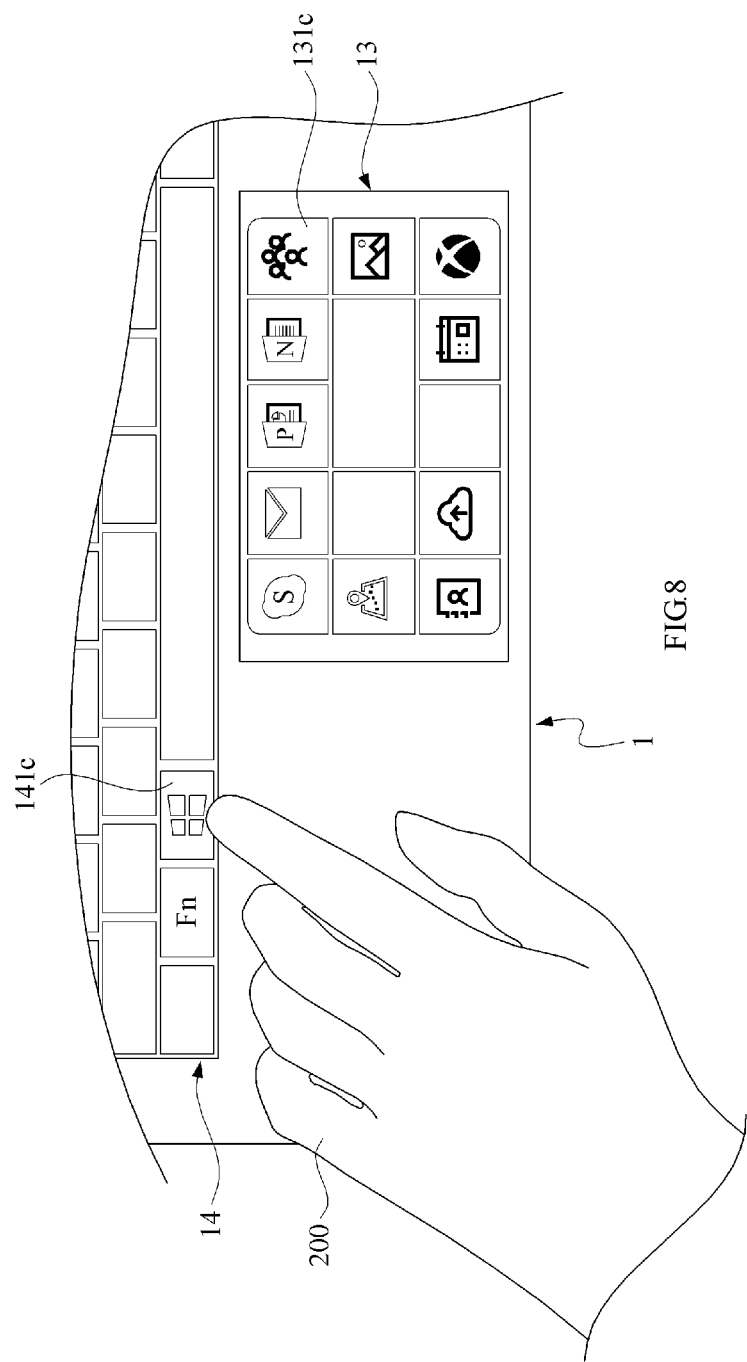
FIG. 8 is a schematic diagram showing an instant operation interface displayed on a touch operation display when the practical operation event is a key operation event in a control method in an embodiment.

Please continue to refer to FIG. 8. FIG. 8 is a schematic diagram showing an instant operation interface is displayed on a touch operation display when a practical operation event is a key operation event according to a control method in an embodiment. As shown in FIG. 8, when the function key 141c of the keyboard 14 is pressed, according to the step S1 of the control method, the key operation event that the function key 141c is pressed is defined as a practical operation event. Furthermore, the instant operation interface corresponding to the practical operation event is displayed on the touch operation display 13 according to the step S4 of the control method. Then, a plurality of touch options 131c (only one is numbered in figure) are displayed on the touch operation display 13.

According to the control method in an embodiment, an operation that the function key 141c of the keyboard 14 is pressed is preset as a key operation event. Furthermore, the operation interface corresponding to the key operation event is preset. Then, when the function key 141c is pressed, the instant operation interface is displayed correspondingly on the touch operation display 13. In an embodiment, the operation interface is a basic operation interface.

In sum, according to a control method in embodiments, the practical operation event generated due to an operation on the operating system is compared with the predetermined operation event. When the practical operation event conforms to the predetermined operation event, a corresponding operating interface is displayed on the touch operation display. Then, the user can operate via the touch operation display. Conventionally, a notebook computer is configured with a display screen instead of a touch panel. However, the display screen only has a cursor operation function and a graphical input function. In contrast, the operation convenience of the operating system in embodiments is improved.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A control method, applied to an electronic device with a main display and a touch operation display, comprising the steps of:
    initiating a first operation event by a user depression of a function key, the first operation even being a key operation event;
    defining the key operation event as a first instant operation event;
    defining a first operation interface corresponding to the key operation event, the first operation interface including a plurality of touch options having functions of a plurality of function keys;
    defining a first display image associated with the key operation event;
    displaying the first operation interface on the touch operation display, and the first display image on the main display;
    initiating a second operation event by execution of an application program or a function of the application program that has been executed, the second operation event being an application program operation event;
    defining the application program operation event as a second instant operation event;
    defining a second operation interface corresponding to the application program operation event, the second operation interface including a plurality of touch images corresponding to a plurality of functional features of the application program or the function of the application program;

defining a second display image associated with the application program operation event; and displaying the second operation interface on the touch operation display, and the second display image on the main display.

2. The control method according to claim 1, further comprising:

determining that the first and second operation events are triggered by detecting the first and second operation events during executing an operating system.

3. The control method according to claim 1, further comprising:

determining that the first and second operation events are triggered by receiving a triggering notification of the first and second operation events.

4. The control method according to claim 1, further including a step of updating at least one of the instant display image and the instant operation interface according to an operation on the instant operation interface.

5. An electronic device, comprising:

a host, including:

a host body;

a system module built in the host body and configured to:

initiate a first operation event by a user depression of a function key, the first operation event being a key operation event;

define the key operation event as a first instant operation event;

define a first operation interface corresponding to the key operation event, the first operation interface including a plurality of touch options having functions of a plurality of function keys;

define a first display image associated with the key operation event; and cause a touch operation display to display the first operation interface, and cause a main display to display the first display image;

initiate a second operation event by execution of an application of program or a function of the application program that has been executed, the second operation event being an application program operation event;

define the application program operation event as a second instant operation event;

define a second operation interface corresponding to the application program operation event as a second instant operation interface corresponding to the application program operation event, the second operation interface including a plurality of touch images corresponding to a plurality of functional features of the application program or the function of the application program;

define a second display image associated with the application program operation event; and cause the touch operation display to display the second operation interface, and cause the main display to display the second display image;

the touch operation display, disposed in the host body, electrically connected to the system module and configured to display the first instant operation interface and the second instant operation interface; and the main display, electrically connected to the host body and configured to display the first display image and the second display image.

6. The electronic device according to claim 5, wherein the system module comprises:

a storage device storing computer program data, the key operation event and the application program operation event; and a processing unit, electrically connected to the storage device, configured to detect the first and second operation events and determine whether the first and second operation events confirm to one of the key operational event and the application program operation event according to the computer program data.

* * * * *